Patented Jan. 6, 1953

2,624,654

UNITED STATES PATENT OFFICE 2,624,654

METHOD OF MAKING PURIFIED BRINE

Alfred Hirsch, Painesville, Ohio, assignor to Diamond Alkali Company, Cleveland, Ohio, a corporation of Delaware No Drawing. Application June 3, 1949,
Serial No. 97,095

6 Claims. (Cl. 23—42)

This invention relates to a method for making purified sodium chloride brine from impure solid rock salt, the principal impurities of which are sulfate salts of significant solubility under the conditions of preparation of the brine.

In the ammonia-soda process for the manufacture of soda ash from sodium chloride, the sulfate ion content of the sodium chloride brine employed as a principal raw material thereof contributes to the fouling of process liquor lines and other equipment by reason of the deposition of insoluble calcium sulfate upon the surfaces of such equipment with which the process solutions come in contact. In the manufacture of caustic soda by the electrolytic method, wherein a sodium chloride brine is decomposed electrolytically to form chlorine, hydrogen, and caustic soda, the sulfate ion content of the brine contributes materially to the erosion of the carbon electrodes of the electrolytic cells.

The brine used in these processes is prepared by bringing water into dissolving contact with a body of impure sodium chloride, such as rock salt, usually in the form of a deposit many hundreds of feet below the earth's surface; although in those manufacturing operations, which do not have a salt deposit readily accessible, the brine is prepared by placing granulated salt in large dissolving tanks and bringing water into dissolving contact with the salt in the tanks. The so-prepared brine is obtained as a substantially saturated aqueous solution of sodium chloride containing minor but significant amounts of other salts, such as magnesium chloride, calcium sulfate, sodium sulfate, and magnesium sulfate, also dissolved therein. The removal of calcium and magnesium ions from the brine has heretofore been generally effected by first making the brine slightly alkaline, as by adding thereto an amount of lime (CaO) or alkali metal hydroxide. The precipitate of magnesium hydroxide is allowed to settle and is separated by decantation. Thereafter, the calcium ions remaining in the brine are precipitated by carbonating the brine with sodium or ammonium carbonate in order to effect a precipitation of insoluble calcium carbonate. The insoluble calcium carbonate is readily separated from the remainder of the brine solution by settling and/or filtration. This method of purifying a brine solution does not decrease the sulfate ion concentration of the brine appreciably and the sulfate ions, when carried over into the chemical process for the production of soda ash or into the electrolytic cells of the electrolytic process for the manufacture of caustic soda and chlorine by the electrolysis of brine, deleteriously affect the process equipment.

The effects of appreciable sulfate ion concentration in the brine are most apparent in that part of the ammonia-soda process commonly referred to as the "ammonia still." In the ammonia still, a feed liquor consisting principally of ammonium chloride, ammonium carbonate and bicarbonate, and sodium bicarbonate is fed to the top of a decomposing tower, where it is brought into direct contact with live steam, thereby to decompose the ammonium carbonate and bicarbonate to ammonia and carbon dioxide. As the feed liquor falls through the tower from the section in which the ammonium carbonate and bicarbonate is decomposed, it is mixed with a hot solution of milk of lime in what is commonly termed the "lime section" of the ammonia still. In this portion of the ammonia still, the alkaline milk of lime reacts with the ammonium chloride to form ammonia and calcium chloride respectively. Appreciable sulfate ion concentration in the liquor fed to the ammonia still causes relatively copious precipitation of calcium sulfate in the lime section of the still, which may be due in part to the temperature of the liquor in view of the high concentration of calcium ions therein, since calcium sulfate is less soluble in hot aqueous media than in cold aqueous media. In any case, gradual deposition of a heavy, stone-like, monolithic layer of calcium sulfate ensues in the lime section of the still, which layer must be manually dislodged periodically, for example, every 80 to 100 days. Removing the stone-like deposit of calcium sulfate from the lime section of the ammonia still is a costly and time-consuming operation involving many man hours of labor and loss of the use of equipment. The problem of economically decreasing the causal sulfate ion concentration of the salt brine fed to the process to a point where the accumulation of the calcium sulfate deposit is eliminated or materially lessened, has not heretofore been satisfactorily solved.

One of the objects of the present invention is to provide a method for precipitating insoluble magnesium hydroxide and simultaneously therewith to inhibit the dissociation of sulfate salts during the step of dissolving rock salt to obtain a brine solution. This is in marked contrast to the prior art methods consisting first, in dissolving the rock salt and soluble magnesium and calcium compounds along with appreciable amounts of soluble sulfate compounds, and subsequently, after obtaining the brine, precipitating insoluble magnesium hydroxide and calcium carbonate in a separate operation, while allowing soluble sulfate compounds to be carried through the process.

Another object of the present invention is to precipitate insoluble magnesium hydroxide and inhibit the solution of calcium sulfate during the dissolution of the rock salt, whereby these impurities remain behind at the locus of the brine making step, and the multiple step method of purifying the brine thereafter is eliminated.

Messrs. F. K. Cameron and J. M. Bell have reported in J. A. C. S., vol. 28 (1906), at pages 1220 to 1222, the results obtained from an investigation of the compositions of aqueous solutions of gypsum, to which lime had been added, and compositions of aqueous solutions of lime, to which gypsum had been added, no other salts being present in the system. The further system of solutes consisting of calcium hydroxide-calcium sulfate-sodium chloride in water solution has now been investigated for concentrated sodium chloride brine and it has been found that the combination of calcium hydroxide and sodium chloride in solution represses materially the solubility of calcium sulfate and does so to a greater extent than does a solution of calcium hydroxide alone. I am able to make use of this finding in the method of the present invention and obtain from rock salt contaminated with soluble magnesium salts, calcium sulfate and other appreciably soluble sulfate salts, a highly purified brine.

The method of the present invention includes the steps of contacting a body of impure, solid sodium chloride with a solution of calcium hydroxide in water, removing the salt solution thus formed from contact with said solid sodium chloride, precipitating calcium ions from said salt solution, and separating the precipitate from said salt solution.

In accordance with the method of the present invention, a solution of calcium hydroxide, which is suitably prepared by hydrating ordinary lime (CaO) and normally contains the equivalent of about 1.2 gms. per liter of calcium oxide, is brought into dissolving contact with solid, impure rock salt at a dissolving situs. Where the rock salt from which the brine is made contains significant amounts of soluble magnesium compounds, for example, more than 0.1–0.2% as magnesium, a slurry of hydrated lime having a correspondingly greater equivalent CaO concentration is employed. The dissolving situs may in some instances be an underground deposit of salt, such as that found in the Great Lakes region of the United States, or it may be a large tank or vessel in which granulated or so-called rock salt is placed. As the sodium chloride in the rock salt begins to dissolve away, the usual insoluble impurities, such as silica, clay, and some calcium sulfate remain behind. Insoluble precipitates of magnesium hydroxide, derived from soluble magnesium salts in the rock salt, as well as insoluble calcium sulfate formed from the calcium ions in solution in the dissolving water and from the soluble sulfate salts present in the rock salt deposit, are also formed and remain behind. When the solution of the sodium chloride in the salt deposit is effected underground, the precipitates of magnesium hydroxide and calcium sulfate are deposited as a mass of mud situated at the base of the mine cavity. Similarly, when the salt is dissolved in large dissolving tanks from a mass of granulated rock salt crystals, the method of the present invention may be so employed as to leave the deposit of the insoluble materials behind in the dissolving tank, from which such insoluble materials in the form of mud may readily be removed.

A substantially saturated sodium chloride brine is removed from dissolving contact with the salt, whether the dissolution is carried out in an underground deposit or in a dissolving tank, and is thereafter treated with a calcium precipitating agent, such as alkali metal or ammonium oxalates, phosphates, carbonates, and the like. For economic reasons, the brine solution is preferably carbonated with an alkaline carbonate material, such as sodium carbonate or ammonium carbonate, in order to effect the precipitation of the residual calcium ions remaining in the brine solution. The insoluble calcium precipitate thus formed may readily be removed from the brine solution either by settling or by filtration after a lapse of time sufficient to insure substantially complete precipitation. The thus prepared sodium chloride brine is then ready to be fed to a chemical process for the manufacture of soda ash or to an electrolytic process for the preparation of caustic soda and chlorine. The lower sulfate ion content of such brine materially lengthens the period within which an ammonia still, particularly the lime section thereof, may remain in service before removal of the calcium sulfate deposit becomes necessary. Moreover, it is found that the use of such purified brine in the electrolytic process for the production of caustic soda and chlorine materially lengthens the life of the carbon electrodes employed in the electrolytic cells.

A further advantage obtains in the method of the present invention in that the two-step purification process of the prior art, which requires relatively large equipment in order to process a large volume of sodium chloride brine, is replaced by a one-step process. In effect, this allows the manufacturer of soda ash or caustic soda by the electrolytic method substantially to double the brine treating capacity of existing equipment. Further, it is of significance in the method of the present invention that the one remaining step in the commercial purification of brine for the production of caustic soda is substantially identical with the second of the two steps of the prior art method and hence, no new or additional processing equipment is required to practice the method of the present invention and substantial economic advantage thereby obtains.

In order that those skilled in the art may better understand the method of the present invention and in what manner the same may be carried into effect, the following specific example is offered:

*Example*

A body of solution of hydrated calcium oxide (containing 1.18 gms. per liter of calcium oxide) and an equal volume of distilled water are each brought into dissolving contact with separate masses of granulated rock salt having the following analysis:

Water insolubles _____ 0.46%
Calcium ion _____ 0.44%
Magnesium ion _____ 0.04%
Sulfate ion ___ 0.96% (1.36% as calcium sulfate)

In each experiment, the amount of salt employed is in excess of the amount soluble in the volume of solvent with which such salt is in contact. The solutions are gently agitated periodically and the brine thus formed allowed to remain in contact with the granulated rock salt to determine the increase, if any, of the sulfate ion concentration of the brine solution with the passage of time. Samples of the brine are taken from time to time and the sulfate content thereof determined and calculated as calcium sulfate. The results of this procedure are set forth in the following table:

| Time (Hours) | g./l. SO₄ Calculated as CaSO₄ | |
| --- | --- | --- |
| | Blank | Test Sample |
| ½ | 0.78 | 0.26 |
| 18 | 1.40 | 0.38 |
| 42 | 1.82 | 0.72 |
| 66 | 2.02 | 0.94 |
| 90 | 2.36 | 1.20 |
| 162 | 2.54 | 1.24 |
| 354 | 2.94 | 1.75 |

These experiments are conducted under conditions comparable to those existing in the two principal methods of obtaining brine from solid rock salt. Thus, in the method employing granulated rock salt, such rock salt is placed in a dissolving tank having a false bottom of perforated metal or ceramic material, the amount of salt being in excess of that which will dissolve in a volume of water equal to that of the volume of the tank. Water from any suitable source having dissolved therein about 1.2 g./l. of CaO (1.5 g./l. Ca(OH)₂) is brought into dissolving contact with the salt in the tank and intermittently agitated until a saturated brine is obtained. Thereafter, purified brine is withdrawn as needed by allowing the brine to flow through the mass of granulated salt; insoluble impurities for the most part settle into the compartment beneath the false bottom of the tank. More granulated salt and water containing dissolved Ca(OH)₂ are added to the tank as needed from time to time. Purified brine withdrawn from the compartment of the tank beneath the false bottom thereof is carbonated by the addition to such brine of an amount of alkali metal carbonate or ammonium carbonate in excess of that required to precipitate the residual calcium ion content of the brine and the calcium carbonate formed as a result of such addition separated from the brine by filtration.

In the hydraulic mining method of obtaining brine from a subterranean deposit of salt, water containing about 1.2 g./l. of dissolved CaO (1.5 g./l. Ca(OH)₂) is pumped into the subterranean salt deposit and remains in contact with the salt for a time sufficient substantially to saturate the water with sodium chloride; the brine thus formed is forced to the earth's surface, carbonated in the manner described above, and thereafter delivered to an ammonia-soda process operation or to electrolytic cells for the electrolysis of brine.

The data set forth in the table above include the extremes of these two aspects of the present method for obtaining sodium chloride brines. In the first aspect, the brine is in dissolving contact with the impurities of the salt for relatively short periods of time, comparable to conditions obtaining when the data in the upper half of the table were taken. In the second aspect of the method, where salt is dissolved from a subterranean deposit thereof, the brine may remain in dissolving contact with impurities in the salt for much longer periods of time, comparable to conditions obtaining when the data in the lower half of the table were taken. This is particularly true where there is a very large cavity in the salt deposit into which the lime-containing water is pumped. In fact, a given portion of salt brine may remain within a cavity for periods calculated to be the order of one year, depending upon the size and shape of the cavity and characteristics of the fluid circulation therewithin, although the given portion of brine is not in dissolving contact with impurities of the salt deposit during the entire period of time.

In either use of the method, from the table of data given above, it is apparent that the sulfate ion concentration of the brine is diminished by ⅔ to ½ of that acquired by brine obtained from water to which CaO has not been added, even where the brine remains in dissolving contact with the impurities of the salt for extended periods of time.

While there has been described an embodiment of the invention, the methods described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing a calcium precipitating agent into said solution to precipitate a calcium salt from said solution, and separating said calcium salt from said solution.

2. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing a salt providing carbonate ions into said solution to precipitate calcium carbonate from said solution, and separating said calcium carbonate from said solution.

3. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing a calcium precipitating agent selected from the group consisting of alkali metal and ammonium oxalates, phosphates, and carbonates into said solution to precipitate a calcium salt from said solution, and separating said calcium salt from said solution.

4. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing a phosphate ion yielding salt into said solution, precipitating calcium phosphate therefrom, and separating said calcium phosphate from said solution.

5. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing ammonia and carbon dioxide into said salt solution to precipitate calcium carbonate therefrom, and separating said calcium carbonate from said solution.

6. The method of making a substantially saturated sodium chloride brine from solid sodium chloride contaminated with impurities including sulfate, calcium, and magnesium salts, which brine contains reduced amounts of said impurities, which includes the steps of contacting a body of such contaminated solid salt with a solution of calcium hydroxide in water, dissolving said salt therein until sodium chloride saturation is obtained, removing the salt-containing solution from contact with said solid salt and impurities, introducing sodium carbonate into said solution to precipitate calcium carbonate therefrom, and separating said calcium carbonate from said solution.

ALFRED HIRSCH.

REFERENCES CITED

The following references are of record in the file of this patent:

UNITED STATES PATENTS

| Number | Name | Date |
|---|---|---|
| 108,198 | Smith | Oct. 11, 1870 |
| 304,341 | Mebus | Sept. 2, 1884 |
| 623,295 | Vis | Apr. 18, 1899 |
| 675,686 | Vis | June 4, 1901 |
| 755,415 | Trantom | Mar. 22, 1904 |
| 1,311,481 | Wrinkle et al. | July 29, 1919 |
| 1,363,091 | Cullen | Dec. 21, 1920 |
| 1,475,563 | Brooks | Nov. 27, 1923 |
| 1,597,370 | Freeth | Aug. 24, 1926 |
| 1,750,761 | Martin | Mar. 18, 1930 |
| 1,999,709 | Terziev | Apr. 30, 1935 |
| 2,082,989 | Thomsen | June 8, 1937 |
| 2,404,550 | Thomsen | July 23, 1946 |
| 2,433,601 | Comstock | Dec. 30, 1947 |

FOREIGN PATENTS

| Number | Country | Date |
|---|---|---|
| 23,024 | Great Britain | A. D. 1899 |
| 25,082 | Great Britain | A. D. 1909 |
| 169,192 | Great Britain | Sept. 16, 1921 |
| 247,405 | Great Britain | Feb. 18, 1926 |

OTHER REFERENCES

"Solubilities of Inorganic and Organic Compounds," by A. Seidell, Second Ed., second printing (1919), pages 215, 218. D. Van Nostrand Co., Inc., N. Y. publishers.

J. W. Mellor's: "A Comprehensive Treatise on Inorganic and Theoretical Chemistry," vol. 3, 1923 Ed., pages 785, 786, and vol. 2, 1922 Ed., page 526; Longmans, Green & Co., N. Y. publishers.